US007885863B2

(12) United States Patent
Ojakaar et al.

(10) Patent No.: US 7,885,863 B2
(45) Date of Patent: Feb. 8, 2011

(54) METHODS AND COMPUTER READABLE MEDIA FOR ENHANCING PRODUCT REVIEWS

(75) Inventors: Erik Ojakaar, Santa Clara, CA (US); Alexander Jan Verhage, Oakland, CA (US); Gabriel Alejandro Celemin, Buenos Aires (AR); Jonathan James Trevor, Santa Clara, CA (US); Jonathan Cordero Cruz, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1062 days.

(21) Appl. No.: 11/514,429

(22) Filed: Aug. 31, 2006

(65) Prior Publication Data

US 2008/0071602 A1   Mar. 20, 2008

(51) Int. Cl.
*G06Q 30/00* (2006.01)
*G06F 17/30* (2006.01)

(52) U.S. Cl. .................. 705/26.7; 705/26.1; 705/26.61; 705/26.64

(58) Field of Classification Search .............. 705/14.19, 705/14.23, 14.4, 26–27
See application file for complete search history.

(56) References Cited

U.S. PATENT DOCUMENTS

| | | | | |
|---|---|---|---|---|
| 5,963,916 | A * | 10/1999 | Kaplan | 705/26 |
| 6,064,980 | A * | 5/2000 | Jacobi et al. | 705/26 |
| 6,275,227 | B1 * | 8/2001 | DeStefano | 369/30.01 |
| 6,963,848 | B1 * | 11/2005 | Brinkerhoff | 705/10 |
| 2001/0021914 | A1 * | 9/2001 | Jacobi et al. | 705/8 |
| 2005/0049941 | A1 * | 3/2005 | Kaplan | 705/27 |
| 2005/0125307 | A1 * | 6/2005 | Hunt et al. | 705/26 |
| 2007/0043583 | A1 * | 2/2007 | Davulcu et al. | 705/1 |

OTHER PUBLICATIONS www.Epinions.com. Feb. 27, 2005. [recovered from www.archive.org on Apr. 7, 2010].*

* cited by examiner

*Primary Examiner*—William Allen
(74) *Attorney, Agent, or Firm*—Hickman Palermo Truong & Becker LLP

(57) ABSTRACT

A review writing tool guides a user through the process of writing an enhanced product review. The review writing tool can include a web user interface, which breaks the review writing process down into multiple stages so the review writer can incrementally write the review. In addition, the review writing tool provides prompts, examples, and instructions to guide the review writer through the writing process. The review writing tool also allows a review writer to add a list of related products from a related product database to the review. For example, a review writer may have evaluated a number of products before selecting the product the review writer ended up purchasing. Accordingly, the review writer can add information about those other products to his review. Doing so allows subsequent consumers to browse not only the product a review writer purchased, but also products the review writer recommends.

25 Claims, 7 Drawing Sheets

METHODS AND COMPUTER READABLE MEDIA FOR ENHANCING PRODUCT REVIEWS

BACKGROUND

One of the advantages that the Internet provides to consumers is the ability to research specific products and find out information about those products before making a purchase. A popular venue for researching products is user reviews. Several studies have found that consumers go to online user reviews of products to not only help them research specific products but also to discover similar or related products of which the consumer was previously unaware.

User reviews generally include a short summary of a user's reason for purchasing (or not purchasing) a product. In some user reviews, the user lists the names of other products they considered before settling on the one they chose to purchase. Numerous online retailers, online magazines, and product review websites provide links next to featured products so users can describe their opinions about the product.

As useful as user reviews can be, there are still several drawbacks to the way they are currently implemented. First, current online user review pages are more or less "dead-ends". In other words, current online user review pages do not provide any convenient mechanism for consumers reading a review to go to products mentioned by users in their review. This can make product discovery and research a tedious process.

In addition, consumers often do not have any information about the review writer to help them decide how knowledgeable the review writer is on the product being discussed. This means that a consumer has to rely almost exclusively on their own judgment as to the trustworthiness of a review writer.

Finally, writing an informative user review can be a tedious process and more time consuming than many users are willing to put up with. In fact, for many users the time and energy required to write a review is the main reason they do not write reviews.

The approaches described in the section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
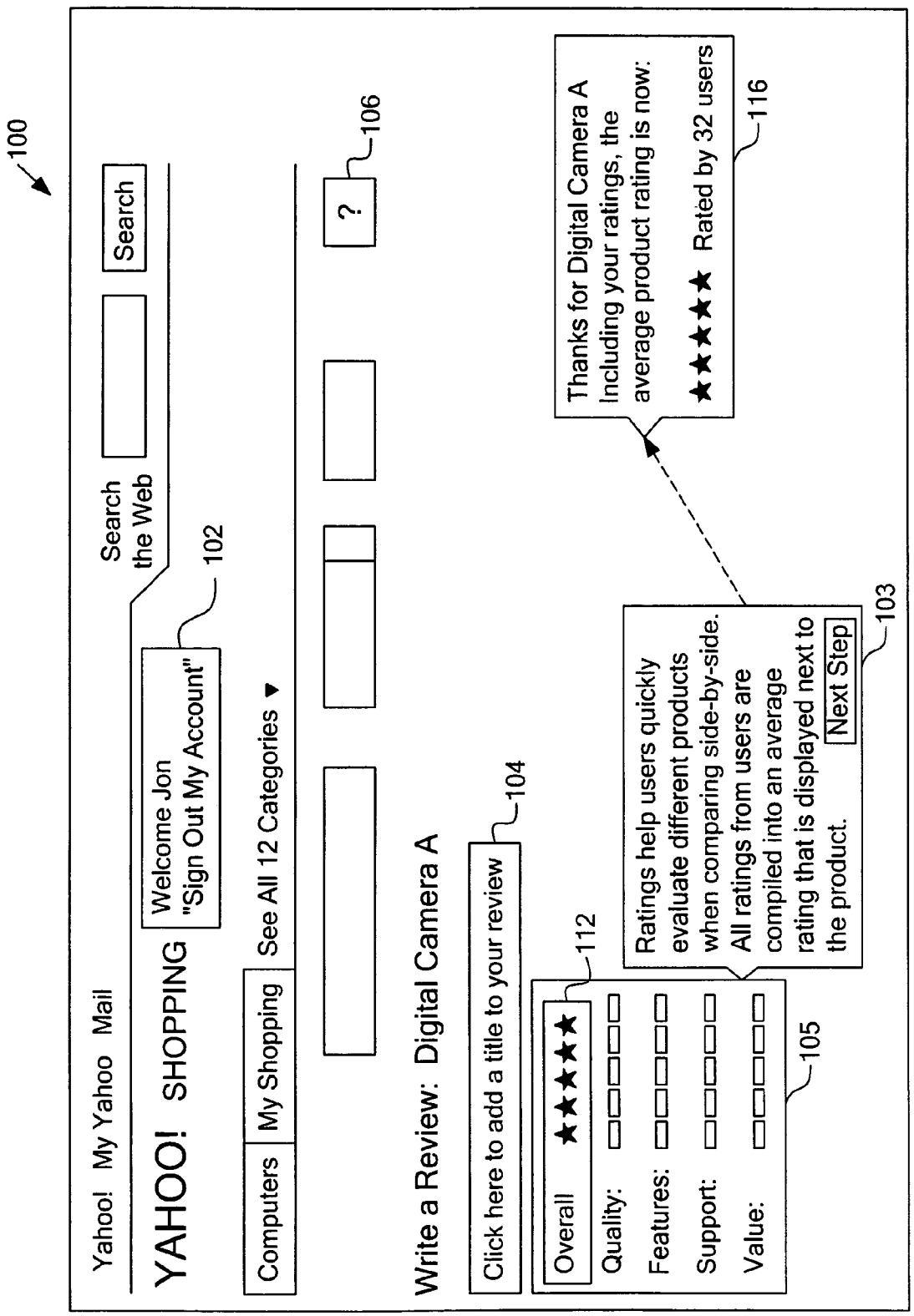
FIG. 1 illustrates an exemplary user interface for collecting title and rating information from a review writer, in accordance with an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Mechanisms described herein enhance the process of writing a product review. In one embodiment, a review writing mechanism is provided to guide a user through the process of writing a review for a product. The user writing the review is referred to herein as the "review writer." The review writing mechanism, according to one embodiment, includes a web user interface, accessible through a web browser, which breaks the review writing process down into multiple stages. By breaking the review writing process down into multiple stages, the review writer can incrementally write a review. In addition, the review writing mechanism can guide the review writer during the review writing process by giving examples, instructions, and suggestions as the review writer is prompted for review information.

To further enhance the process of writing product reviews, in one embodiment, the review writing mechanism includes a feature that allows a review writer to create and add a list of other products to the review. The "other-products list" may include, among other things, products and/or accessories the review writer evaluated or recommends. To create the list, the review writer accesses a searching mechanism included in the review writing mechanism. The searching mechanism allows the review writer to search for and add products to the other-products list. For example, a review writer may have researched and evaluated a number of products before selecting the product the review writer ended up purchasing. According to one embodiment, the review writer accesses the searching mechanism to search for and selectively choose products to add to the other product list. The list is displayed as a part of the final product review. In one embodiment, the other-products list includes links to the other products so subsequent review readers can view and browse the other products a review writer evaluated and/or recommends.

In addition, mechanisms described herein perform a variety of other functions to enhance a product review.

Product

A "product" as used herein includes a broad spectrum of subject matter. Product can include consumer goods and services, movies, music, books, and other entertainment media, educational offerings, performers and/or professionals (e.g., an author, mechanic, attorney, musician, doctor, etc.), real estate property, vacation destinations, chattel, and other subject matter. For example, in one embodiment, a product is a digital camera purchased through an online retailer. Or, a product is a movie in theaters. In one embodiment, product includes the legal services provided by an attorney during a divorce. A "purchase" of the product includes buying, using, hiring, viewing, accessing, consuming, attending, researching, or otherwise becoming familiar with the product.

Enhanced User Reviews

Note that even though the techniques described herein are described in terms of a search engine and/or Internet environment, these environments are meant only to serve as exemplary environments in which the techniques of the present invention are employed. In alternative implementations, the techniques may be employed in other environments.

Review Writing Tool

Consumers often look to product reviews as part of product research and discovery. Therefore, current online product reviews should be enhanced to include the type of information that a consumer typically wants to know before purchasing a product. That information can include information about the actual setup and use of a product, the names of similar products, accessories that enhance a product's usefulness, and other such information. Accordingly, a review writing tool as described herein provides a way for review writers to enhance product reviews.

The review writing tool can be an extension to an application, a script executed by a web browser, a database client program, or some other client-side application. Moreover, specific implementations of the review writing tool may be written in any of a number of programming languages (e.g., Perl, C++, C#, Visual Basic, C, Java, SQL, XML, HTML, JavaScript, Flash, etc.). Alternatively, variations are implemented by stand-alone programs, distributed programs, server-side programs, or a combination of these variations.

In one embodiment, the review writing tool is a web application hosted at least in part by a web server. According to one embodiment, the review writing tool includes a web user interface that executes in a review writer's client web application and guides the review writer through the process of writing the product review. As part of the review writing process, the review writing tool breaks the process down into various stages. By breaking the review writing process down into various stages, the review writing tool lets the review writer incrementally complete the review (e.g., saving the review after each stage of the process). In this way, a review writer is not overwhelmed by the writing process.

In one embodiment, the review writing tool includes mechanisms that provide encouragement, show prompts, examples, instructions, and even make suggestions about how to enhance the review throughout the review writing process. The review writing tool may also include an other-products list, which is described in greater detail hereafter.

When the review writer has completed the various stages of the review writing process, the review writing tool saves the review as a webpage and uploads the product review to a web server, where it is published. Once published, subsequent review readers can access the product review's webpage through their web browsers.

The Other-Products List

In one embodiment, the review writing tool includes mechanisms that allow the review writer to include information about other products and accessories the review writer evaluated, purchased, or considered purchasing. For example, during the process of writing a review of a digital camera, the review writing tool includes user interface controls that permit the review writer to add links to similar digital cameras to the product review.

In one embodiment, the user interface controls facilitate the process of adding the links to the product review by providing access to a searchable repository containing data about digital cameras and their accessories. Accordingly, the review writer inputs a search query, and the review writing tool executes the search query against the repository. The resulting search information about other digital cameras can be added to an other-products list that is displayed in connection with the rest of the review.

The other-products list can include links to similar products, links to other users' comments, pictures, prices, links to an online retailer that sells the other product, and other information a review reader may find useful or interesting.

In one embodiment, the list of other products can help a review reader gain insight into the review writer's expertise on a topic. For example, suppose a review reader researching automobiles has read a variety of reviews from mechanics and other experts that indicate that a particular model of automobile is reliable. Then, the review reader encounters a product review that raves about a different model of automobile and lists the original automobile model under an other-products list, but states that the listed automobile is unreliable. In such a case, the other-products list gives the review reader a starting point to determine whether to trust the review writer's expertise and judgment on a product. In order to create the other-products list, in one embodiment, the review writing tool accesses product information in a product repository.

Product Repository

A "product repository" as used herein is a repository such as a database that is accessible to the review writing tool. The product repository includes products and product information that may be reviewed or added to a review by a review writer. For example, suppose a product review website is dedicated to movie reviews. A product repository associated with the movie review website likely includes a comprehensive list of movies and information about those movies that may be imported into a movie review. Similarly, the product repository may include a wide range of subject matter. For example, suppose an online retailer sells electronic goods, books, computer software, DVDs, and music CDs on their website.

An associated product review website may maintain a repository that includes entries for a wide range of electronic goods, books, computer software, DVDs, and music CDs so review writers can import information into their reviews. Note that a product repository may even include products that the product review and online retailer website do not offer. For example, the online retailer may only carry a certain brand of computer on their website. Yet, to facilitate the product review drafting process, the product repository associated with the online retailer may include information about competing brands so that review writers can compare and contrast computers from different makers.

In one embodiment, the product repository may contain yet additional information about a product. For example, hyperlinks to a product manufacturer's webpage, hyperlinks to other users' product reviews, purchasing information, and any other information that may be of use to a review reader.

Prompt to Write a Product Review

To create an enhanced product review, a review writer generally is prompted to draft a product review after the purchase of a product. A prompt to write a product review can come in a variety of ways. For example, after purchasing a digital camera online, the review writer's web browser can be automatically redirected to a webpage that includes embedded script to launch a review writing user interface. In one embodiment, the review writer is sent an email containing a link to a website hosting an embodiment of a review writing tool. In one embodiment, the review writer does not receive a prompt; instead the review writer initiates the process by navigating to a product review entry webpage.

To illustrate, assume a review writer has recently attended a movie and wants to write a review of the movie. Accordingly, the review writer accesses a movie review webpage hosted by a web server that implements an embodiment of the review writing tool. Upon accessing the movie review webpage a review writing user interface is initiated and the review writer begins the review writing process.

Review Writer Registration

In one embodiment, before a review writer begins drafting a product review, the review writer registers with the product review website. The review writer registers with the product review website in order to provide some level of control and accountability over review writers. For example, by having review writers register with their website, product review websites can impose sanctions or restriction on review writers who abuse the website's web space. To illustrate, if a review writer inputs inappropriate language in a review, then the product review website can restrict that particular review writer from posting additional content. In essence, requiring a review writer to register with the product review website before inputting a product review makes the review writer put his or her "name" on the line when drafting a product review.

In one embodiment, having the review writer register also allows subsequent review readers to gain a measure of trust in a review writer. For example, assume a review writer drafts a product review on a digital camera that a subsequent review reader has confidence in. Later, the review reader would like to know more information about digital camera accessories. The review reader can search for comments and additional product reviews by that review writer.

Note that although, generally, a product review may require registration before a review writer can post, there are instances where a product review website may allow anonymous product reviews. For example, an adult movie review website may want to preserve its users' anonymity. Hence, no registration would be required to post a product review.

User Interface for Writing a Review

FIGS. 1-5 show example portions of a user interface for the review writing tool. In one embodiment, each of FIGS. 1-5 corresponds to a stage in the review writing process. A review writing tool may walk a review writer through stages in the order illustrated in FIGS. 1-5, or in a different order. Further, the various stages, as well as the interfaces that are presented by the review writing tool during the stages, may vary from implementation to implementation.

Turning to FIG. 1, it illustrates a portion of a review writing user interface 100 implemented by a review writing tool. The review writing user interface in FIG. 1 includes a registration control 102 that indicates a review writer is logged in to a product review website, according to one embodiment. The process of registering and signing-up, in this example, is typical of the registration and sign-in process for an online service. Hence, the registration/sign-in process is not described in too much detail herein. It is worth noting, however, that the register and sign-in process may be performed at the time the review writer purchases the product, or the review writer may provide previously obtained registration credentials. In one embodiment, the registration credentials may be stored so that when the review writer returns to a product review website, the review writer does not need to sign-in again.

Once a user is registered and signed-in, the review writing tool displays a user interface for writing a product review. FIGS. 1-5 each illustrate example stages of a user interface for designing a product review. Note that the stages may be presented to the review writer on a single webpage or they may be presented to the review writer over a series of webpages. In one embodiment, the data submitted for the product review is collected through various screens and presented to the user as a completed webpage once all the stages of the review process are complete.

The user interface controls illustrated in FIGS. 1-5 are exemplary of the types of user interface controls and information presented to a review writer. In other embodiments, a different set of user interface controls may be implemented by the review writing tool to collect product review information. Note that the controls may be bubble controls, pop-up windows, overlays, or and number of other types of user interface controls.

In FIG. 1, the first stage of the review writing user interface 100 includes review writing assistant 103, title control 104 to add a title to the review, and rating control 105 to input ratings about the purchased product. In one embodiment, the first stage 100 of the review writing user interface may include help control 106 to open a help menu or to launch the review writing assistant 103. In other embodiments, the review writing user interface 100 includes a different set of controls.

Review Writing Assistant

In one embodiment, the review writing process is enhanced by a review writing assistant 103. The review writing assistant generally refers to a set of user interface controls displayed in the review writing user interface 100. The review writing assistant guides the review writer through the process of drafting a product review. Specifically, the review writing assistant guides the review writer through the process by displaying animated, graphical, textual, and auditory information to encourage and prompt the review writer for product review information.

According to one embodiment, the review writing assistant 103 is launched automatically when the review writer accesses a webpage managed by the review writing tool. The review writing assistant presents the review writer with a series of prompts to encourage the review writer to provide information about a product. Alternatively, the review writing assistant may be manually launched by clicking help control 106 when the review writer wants assistance and/or access to the features of the review writing assistant.

The review writing assistant includes its own set of tools to help in the review writing process. For example, the review writing assistant may provide:

a real-time spell-check,
  a scanning tool to search for product names that are found in an associated product repository
  a tool to replace the names of other-products with links and information retrieved from the product repository,
  a set of questions to consider when writing the review,
  an explanation of features in the review writing user interface, and lists of recently viewed products, instructions and examples on how to write the review.

To illustrate, suppose a review writer clicks on help control 106 of the user interface 100 illustrated in FIG. 1. Clicking help control 106 causes the review writing tool to launch review writing assistant 103. In one embodiment, review writing assistant 103 provides additional user interface controls from which the review writer can select. For example, review writing assistant 103 may include a user interface control that executes a spell-check feature when selected by the review writer.

In one embodiment, review writing assistant 103 includes logic to analyze a review writer's input. For example, the review writer may input keywords into a look-up feature of the review writing assistant. The look-up feature generally refers to a user interface control that allows a user to search for information related to the product review writing process. The look-up includes an associated list or index of information related to the process of writing a product review. For example, the look-up feature may have a search feature that allows the user to search for information on how to spell-check the product review. Accordingly, when the review writer inputs keywords into the look-up feature control, the review writing assistant's logic analyzes the keywords and performs a searched for items in the associated index that are related to the keywords.

In addition, the review writing assistant may allow the review writer to input questions such "how do I change the font size?". The review writing assistant's logic semantically analyzes the question and provides suggested answers.

According to one embodiment, the review writing assistant analyzes what information a review writer has input into the product review and provides instructions and guidance for the next step in the review writing process. For example, suppose the review writer has already entered a title for the product review, the next step in the process is to fill out rating scores for the product. In one embodiment, the review writing assistant detects that the rating scores have not yet been input so the review writing assistant, when launched, opens a window to provide instructions and examples on that particular aspect of the product review.

The review writing assistant 103 may include other features, such as:
- user interface controls to assist in searching for and identifying products mentioned in the body of the review,
- a scanning tool that replaces other products mentioned in the review with links and other information about those products retrieved from an associated product repository,
- a search tool that provides suggestions of other products that the review writer has not already included in the review and that may be similar or related to the product being reviewed.

For example, the search tool may perform a search on an associated product repository for products that have similar ratings, features, and cost and automatically input those similar products into the product review.

Title Control

To easily identify the product being reviewed, a title is typically one of the elements of a product review. A title may be based on the name of the product being reviewed, a descriptive term describing the product, or some other type of label. Title control 104 generally refers to a user interface control in review writing user interface 100 for inputting a title for a product review. According to one embodiment, user interface controls such as title control 104 are meant to be self-explanatory. For example, title control 104 may include text such as "Click here to add a title to your review" to prompt the review writer to add a title to the product review. In one embodiment, review writing assistant 103 can provide similar instructions, examples, and/or prompts to the review writer.

In one embodiment, the review writer creates the title and manually inputs the title into title control 104. In another embodiment, title control 104 imports the name of the product being reviewed directly from a previous transaction or prior webpage. For example, after the review writer has purchased a product, the product title may be stored in a cookie, transaction database, or in temporary storage while the review writer's web browser is redirected to a product review entry webpage. Once the web browser has been redirected to the product review entry webpage, the review writing tool may simply import the product's name from the previous page or transaction into title control 104.

Title control 104 may also include an option to browse for the product title from a product repository. To illustrate, in one embodiment, title control 104 includes a user interface control that allows the review writer to browse for a product by name in an associated product repository. Accordingly, when the review writer selects that control, the review writing tool opens a separate window, which displays a list of products retrieved from the product repository from which the review writer can select the product being reviewed. According to one embodiment, the products listed may be limited to products recently viewed or purchased by the review writer. Alternatively, the list is displayed according to a set of criteria such as product category, manufacturer name, price or some other criteria. The review writer may select the product title to be added to the title control by clicking it with a mouse, dragging and dropping it, or selecting it in some other fashion.

In one embodiment, title control 104 includes a search function feature, which allows the review writer to search for a product by inputting keywords. In one embodiment, review writing assistant 103 provides the title search functionality.

Ratings Controls

After a title has been input into title control 104, in one embodiment, the review writing tool prompts the review writer to rate the product based on a set of rating criteria. In one embodiment, the prompt to enter the review writer's set of ratings is made by review writing assistant 103 as illustrated in FIG. 1. The review writing assistant 103 may further display an explanation of the ratings system and encourage the review writer to submit ratings for the product.

The set of rating criteria used to rate a product varies based on a variety of factors, such as the type of product being reviewed, number of features offered by a product, the product's cost, the target consumer, etc. For example, a movie review may only have one rating criterion: "Rate the movie on a scale of 1-10". On the other hand, the process of rating an automobile may include a dozen or more rating criteria. For example, the review writer may be asked about the quality of the finished product, its reliability, driving enjoyment, sales pressure, gas mileage, environmental friendliness, safety, etc.

The set of rating criteria is generally predetermined by the product review website. However, the review writing tool, in an alternative embodiment, may provide mechanisms in the review writing user interface that allow the review writer to add a set of their own rating criteria to the product review. In such a case, the review writer's set of rating criteria may be displayed in the finished product review, but the scores from the review writer's set of rating criteria are not used in calculating overall product ratings. Alternatively, the additional set of criteria created by the review writer may factor into the overall product ratings.

The review writer's answers to the set of rating criteria are input to the review writing tool through ratings control 105 in review writing user interface 100. Ratings control 105 generally refers to one or more user interface controls that are associated with each criterion in the set of rating criteria used to rate a product. In one embodiment, ratings control 105 displays a prompt to the review writer, asking the user to input a score for each of the criterion in the set of rating criteria. Accordingly, the review writer answers the prompt by inputting or clicking a score in the ratings control 105 for each displayed criterion. The scores for a product are collected by the review writing tool and, in one embodiment, are used to calculate overall scores for the product.

According to one embodiment, the review writer is also prompted to input an overall rating 112 for the purchased product. The overall rating gives review readers a general sense of the review writer's impressions of the product's usefulness and value. Alternatively, the overall rating 112 is a score generated by the review writing tool based on the scores input by the review writer for each of the requested criteria.

After the review writer has input ratings for the set of rating criteria, those scores are collected by the review writing tool from ratings control 105 and may be used in conjunction with ratings received from other users to calculate combined scores for the product.

The combined scores may be the average of the input rating scores or the combined scores may be weighted. For example, the ratings from users who actually purchased the product may be given greater weight than users who are only commenting on the product. In addition, in one embodiment, the combined scores includes a combined overall rating that shows an overall rating for the product based on an average of all the rating scores received from users.

In one embodiment, the combined scores give the review writer an idea of how their input affects the overall ratings of the product. In this way, the review writer gains a sense of accomplishment and contribution by seeing the real effects of their rating scores on the set of combined scores. For example, in FIG. 1, once the review writer has input and submitted their ratings scores for each of the four listed criteria, the review writing assistant opens another window 116 to thank the review writer for submitting ratings scores and to show the combined overall rating for the product. In one embodiment, the combined score for each listed criteria may be updated and displayed to the review writer.

After inputting rating scores into rating control 105, in one embodiment, the review writing tool gives the review writer a prompt to continue to the next stage of the review writing process, or the option to stop and save the review at this point. According to one embodiment, the review writing tool may automatically transition to the next stage of the review writing process after a few seconds wait.

Pros and Cons

Figure 2:
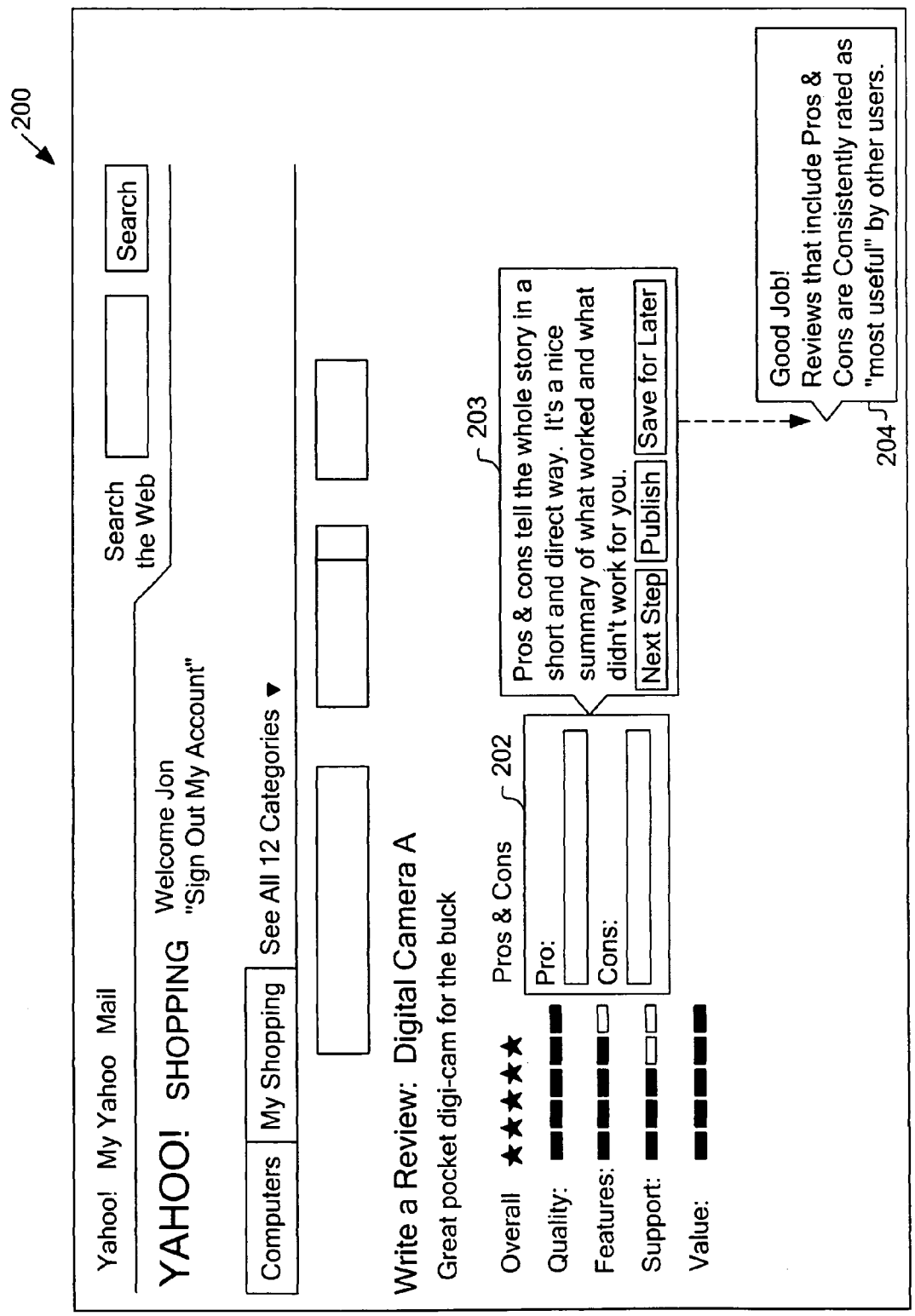
FIG. 2 illustrates an exemplary user interface for collecting comments about a product from the review writer, in accordance with an embodiment of the invention.

After the review writer has completed filling in the information associated with a first stage of the review writing process, the review writing tool prompts the review writer for information associated with a second stage of the review writing process. FIG. 2 illustrates an example review writing user interface 200 displayed by the review writing tool to collect input for a second stage of the review writing process.

In FIG. 2, the review writer is prompted in the review writing user interface 200 to input the pros and cons of the product being reviewed in pros-cons control 202. In one embodiment, a review writing assistant 203 provides instructions to the review writer on how to describe the pros and cons of a product. For example, the review writing assistant may give instructions such as "tell the whole story about a product in a short and direct way."

Pros-cons control 202 refers to a user interface control that receives pro and con input from the review writer. The type of information input into the pros-cons control 202 may vary. For example, in one embodiment, the review writer inputs text into pros-cons control 202. In another embodiment, the review writer records a voice message describing the pros and cons of the product and uploads the voice message to the review writing tool using pros-cons control 202. In yet other embodiment, the review writer includes images or digital content to illustrate the pros and cons of a product.

Once the review writer has input the pros and cons of the product being review, review writing assistant 203 can provide additional encouragement as the review writer completes this stage of the product review. For example, after inputting the pros and cons of a product, the review writing assistant may encourage the review writer to continue by stating "Good Job!" and then giving an explanation about the importance of the pros and cons section of the product review (e.g., "Review that include Pros & Cons are consistently rated as 'most useful' by other users."). In this way, the review writer understands why certain information is being requested and, at the same time, receives validation during the review writing process. In FIG. 2, user interface control 204 illustrates the type of messages provided by the review writing assistant after completing the description of the pros and cons of the product.

After the pros and cons of a product have been described, in one embodiment, the review writing tool may prompt the review writer to continue to a next stage of the review writing process. In one embodiment, the review writing assistant 203 provides the prompt to continue to the next stage and/or save the product review.

If the review writer selects the next stage option, then the review writer's web browser is updated with information from the next stage of the product review process. Alternatively, if the review writer saves the product review, then the review writing tool stores the information collected from the review writer. In one embodiment, storing the information includes adding the information to an associated repository for storing unfinished product reviews. Then, when the review writer returns to the product review entry webpage, the review writing tool retrieves the stored product information and the review writing process continues at the last place completed by the review writer.

In one embodiment, if the user decides to save the product review to complete later, then a message encouraging the review writer to return and complete the review may be displayed. Moreover, the review writer may be prompted by the review writing assistant to schedule a reminder message, such as an email message, to remind him to complete the product review.

In one embodiment, the product review may be considered complete at this point and the product review information is published as a product review and uploaded by the review writing tool to an associated product review website.

Once the product review has been saved by the review writing tool, in one embodiment, the review writer's web browser is transitioned to a logout page.

Full Review

Figure 3:
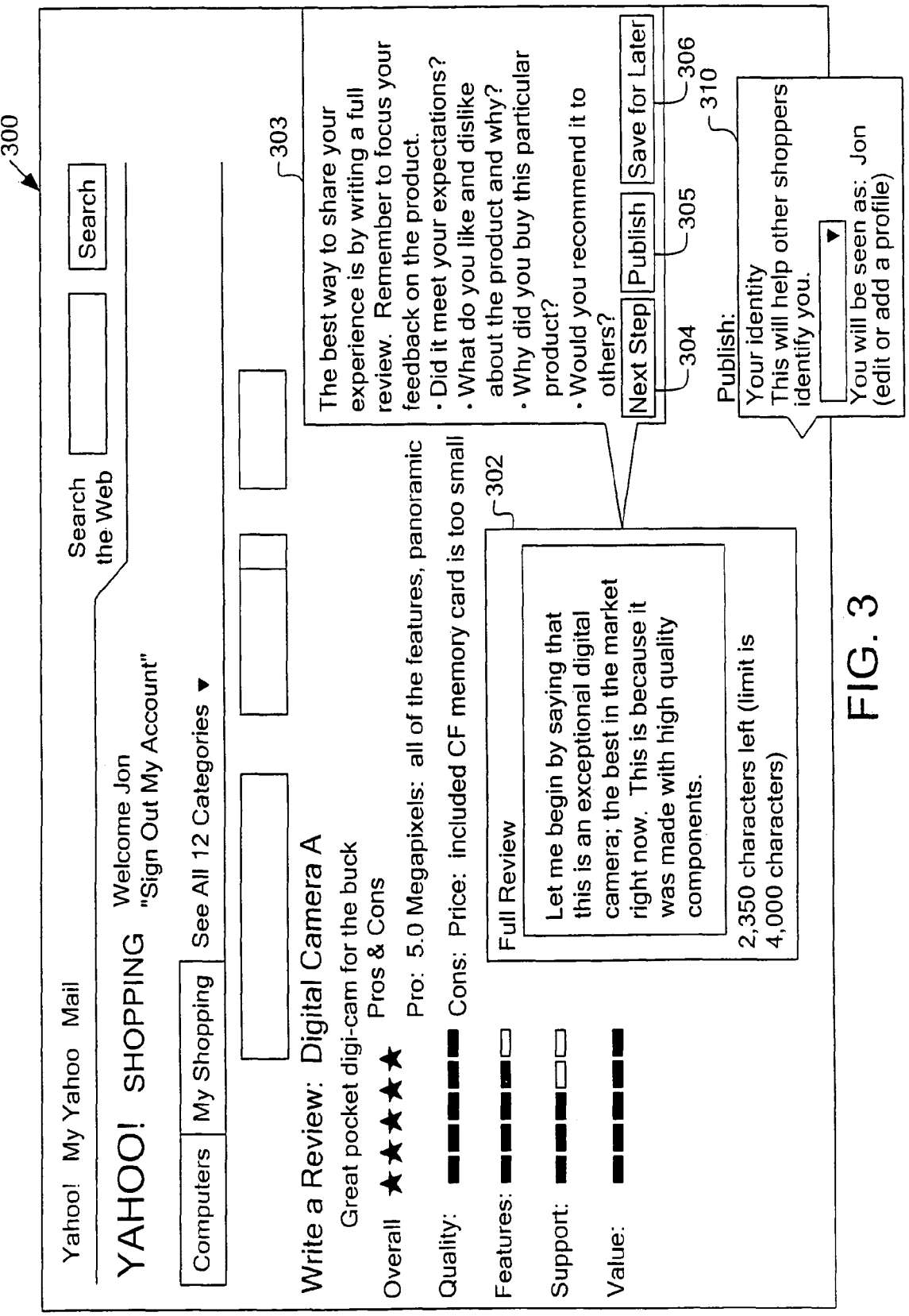
FIG. 3 illustrates an exemplary user interface for collecting a full review of a product from the review writer, in accordance with an embodiment of the invention.

After the review writer has completed filling in the information associated with a second stage of the review writing process, the review writing tool prompts the review writer for information associated with a third stage of the review writing process. FIG. 3 illustrates an example review writing user interface 300 displayed by the review writing tool for obtaining the additional product review information. In FIG. 3, the review writing user interface includes a prompt for the review writer to enter a "full review" of the product. A full review generally refers to a more complete and detailed description as to why the review writer chose a particular product or avoided a particular product. In one embodiment, the review writer inputs the full review into full review control 304.

Full review control 302 refers to a user interface control that collects the full review from the review writer. The type of information input into the full review control 302 may vary. For example, in one embodiment, the review writer inputs text into full review control 302. In another embodiment, the review writer records a voice message giving a detailed description of the product and uploads the voice message to the review writing tool. In yet other embodiment, the review writer includes images or digital content to further illustrate the product. Note that the full review is much more substantive than the pros and cons section described above. The full review may include a more detailed description as to why the review writer purchased a particular product, why the review writer chose the product over other products, as well as, additional comments on the other products, background information on the review writer's expertise, etc.

In an embodiment, full review control 302 may limit the size of the full review. For example, in FIG. 3, full review control 302 limits the amount of text input by the review writer to 4,000 characters.

As is the case with other features of the review writing user interface, review writing assistant 303 may be invoked by the review writer to help the review writer write the full review. For example, according to one embodiment, the review writer is prompted by the review writing assistant to answer questions such as "Did the product meet your expectations?", "Why did you purchase this particular product?", "What other products did you consider?", "Would you recommend the product to others?", etc. The review writing assistant may also provide example sentences or phrases, such as "I bought this product because of these features".

Moreover, the review writer, upon completing the full review, may make user of other features provided by the review writing assistant 303. For example, the review writer may choose to run a spell-check on the full review, scan the full review for other products known to the review writing tool, highlight the other products in the full review, and associate links with the other products. In one embodiment, the review writer manually indicates in the full review control 302 which products to highlight, replace with links, etc. In addition, the full review control 302 may also provide formatting tools that allow the review writer to adjust the font size, font color, font type, and other features of the input.

Once the review writer is satisfied with the full review, in one embodiment, the review writer may select a prompt in review writing user interface 300 to save the product review to complete it later 304, to continue to the next stage 305, or to publish the product review 306. In one embodiment, those prompts are made by review writing assistant 303.

If the review writer chooses to save the product review, then the review writing tool stores all the information input by the user in a repository associated with the review writing tool. Then, as before, the review writer may be prompted to schedule a reminder to return and complete the review later.

If the review writer chooses to continue, the review writing user interface 300 transitions to the next stage of the product review process.

Publish the Product Review

After rating a product, discussing the pros and cons of a product, or writing the full review, some review writers may want to finish the review writing process at that point and publish the product review. In one embodiment, review writing user interface 300 prompts the review writer to publish the review with publish control 305. When the review writer selects publish control 305, in one embodiment, the product review information is saved by the review writing tool, converted into a webpage, and uploaded to a product review website so other users have access to it.

In one embodiment, review writing user interface 300, before publishing the product review, opens a prompt to confirm that the review writer wants to publish the review. As part of publishing the product review, in one embodiment, the review writer is prompted to verify their identity before the product review is published. For example, in FIG. 3, the review writing user interface opens an identity control 310, which allows the user to verify their identity before the product review is published. In one embodiment, a review writing assistant may be the mechanism to prompt the review writer to input login name or other identification information to verify the review writer's identity. In one embodiment, the review writer's name (or user name) is published with the review so that subsequent review readers may research for more information about the review writer or for other reviews by the same review writer.

Other Products

At some point in the review writing process, the review writing tool may prompt the review writer for input about other products. For example, the review writer may be prompted for input about other products in review writing interface 400 after completing the full review portion of the product review. The other products include any other product the review writer considers pertinent to the review. Typically, the other products include products the review writer considered or evaluated before settling on one to purchase, recommended accessories, and other such information.

The Other-Product Control

Figure 4:
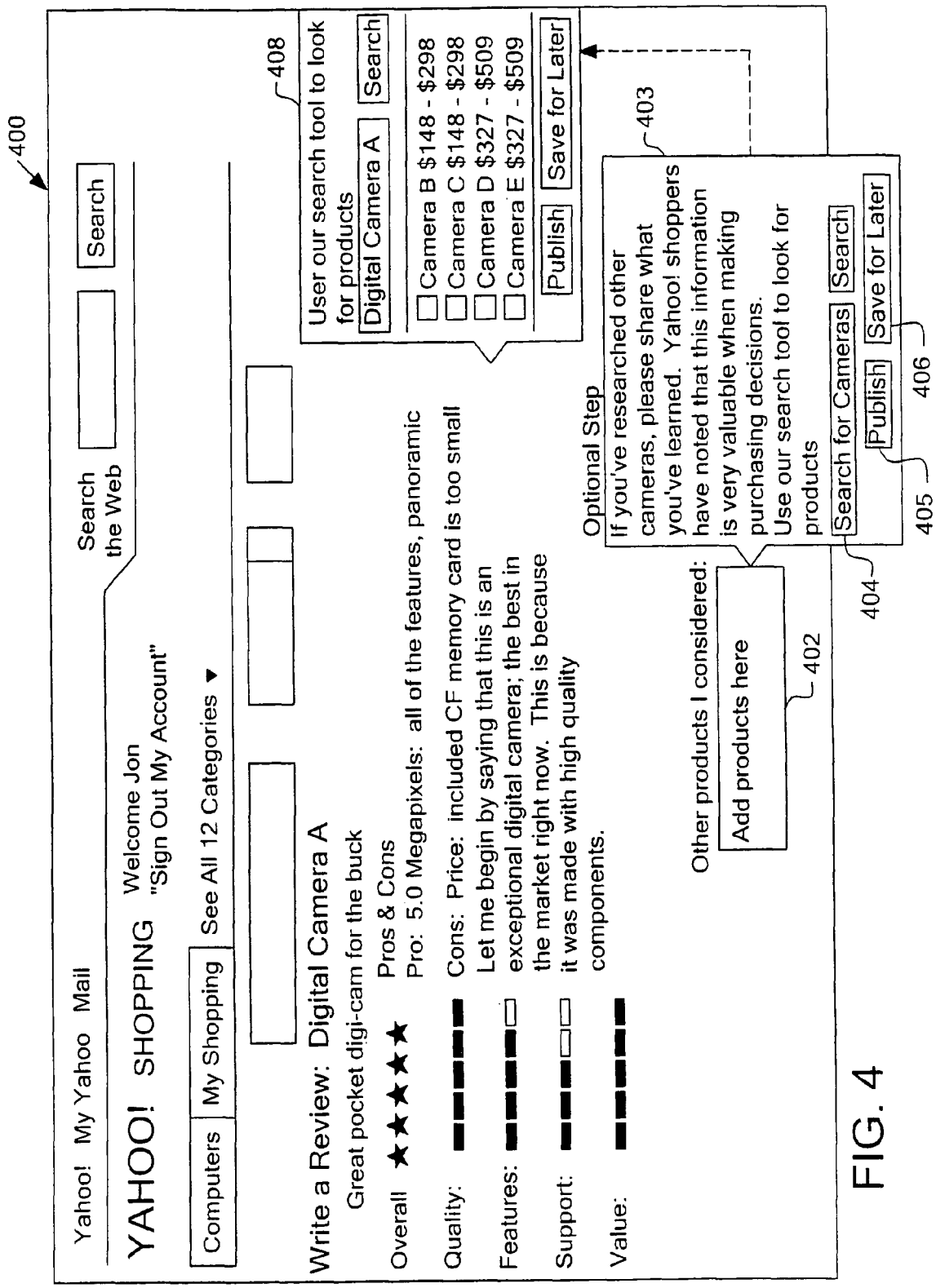
FIG. 4 illustrates an exemplary user interface for adding a list of other related products to the product review, in accordance with an embodiment of the invention.

For example, in FIG. 4, review writing user interface 400 includes other-product control 402. The other-product control 402 allows the review writer to input other products in the product review. By adding other products to the product review, review readers can get an idea about what other products to look at (e.g., which products may be more in line with their price range), how much expertise the review writer has (e.g., if the review writer suggests products the review reader knows are good, that may lend added credibility to a review), what products to avoid, etc.

In one embodiment, the review writer manually enters information about other products into other-product control 402. Once the information is entered, the review writing tool can scan the information in other-product control 402 to identify and highlight other products the review writing tool has information on. For example, if the review writer is describing a car and as part of the review lists several other car models, the review writing tool can invoke a scanning tool that identifies those other car models in the text and highlights them. To identify those other car models, the review writing tool examines the list for product names and manufacturers stored or registered in an associated product repository.

When information about another product is stored in the associated product repository, then the review writing tool may (1) extract the information about the other product from the product repository, and (2) add the information to the product review. Information that is added to a review by the review writing tool is referred to herein as "tool-provided information".

In one embodiment, tool-provided information may include hyperlinks to webpages. For example, suppose the product repository stores hyperlinks to some of the other products' webpages. In such a case, the review writer may request that the review writing tool retrieve those hyperlinks and insert them into other-product control 402. The review writer may also select to include additional information from the product repository, such hyperlinks to other users' product reviews for the other products, and purchasing information.

In one embodiment, the tool-provided information includes search results data obtained by the review writing tool from an Internet search engine. For example, after retrieving information about another product from the product repository, in one embodiment, the review writing tool may submit the product name (and potentially other information) to an Internet search engine in order to retrieve links to stores, other product reviews, etc. The search results may be displayed as part of the additional information associated with a product.

In one embodiment, the list of other products may be automatically generated by the review writing tool. The list of other products is created by extracting keywords from the text input by the review writer and performing a search based on the product repository based on those keywords.

Alternatively, the list of other products (or a subset thereof) may be automatically generated by the review writing tool based on an analysis of the purchasing habits of the review writer and others who purchased the same product (e.g., people who bought the product being reviewed also bought an other product.). For example, suppose users who purchase a particular type of digital camera, also purchase the same model photo printer. Accordingly, when a user drafts a product review for the digital camera, the photo printer can be automatically added to the list of other products. Similarly, if a user purchases the photo printer, information about the particular digital camera may be added to the list of other products for a review of the photo printer.

The Search Control

According to one embodiment, other-product control 402 can include a search control 404 that allows the user to search for other products in the product repository to add to the other-products list in the product review. In one embodiment, search control 404 is managed by review writing assistant 403.

Search control 404 refers to a user interface control that allows the review writer to search for another product in an associated product repository. For example, when the review writer enters the name of a product in search control 404, review writing assistant 403 forwards the search request to the review writing tool. The review writing tool receives the search request and performs a search for the requested other product on its product repository. Alternatively, the search request is forwarded to a search engine.

When results are found, as illustrated in a second view 408 of the review writing assistant, the review writing assistant displays the search results.

The review writer may select one or more of the listed results (e.g., other products) to add to the other products control 402. For example, suppose the review writer wants to add other digital cameras to his review of the digital camera he recently purchased. Accordingly, the review writer enters the keywords "digital camera" into search control 404. In one embodiment, the review writing assistant forwards the request to the review writing tool. The review writing too, in turn, performs a search for "digital camera" on its product repository. The review writing tool finds results related to the term "digital camera" and returns them to the review writing assistant. A second view 408 of the review writing assistant lists the search results for digital cameras. The review writer may then select any of the other digital cameras to include in the product review.

In one embodiment, search control 404 allows the review writer to refine the search results by adding keywords to the search or clicking specific topics, functions, and categories listed in the search results.

According to one embodiment, search control 404 allows the review writer to browse for a product based on product category, manufacturer, price, or other function.

In one embodiment, review writing assistant 403 allows the review writer to drag and drop an other product from the search results to other-product control 402. Alternatively, the review writer can double click on search results to have them added to the other-product control 402. In other embodiments, the review writer may select multiple products from the search results (e.g., by clicking checkboxes or highlighting multiple products at the same time).

User Comments on Tool-Provided Information

Figure 5:
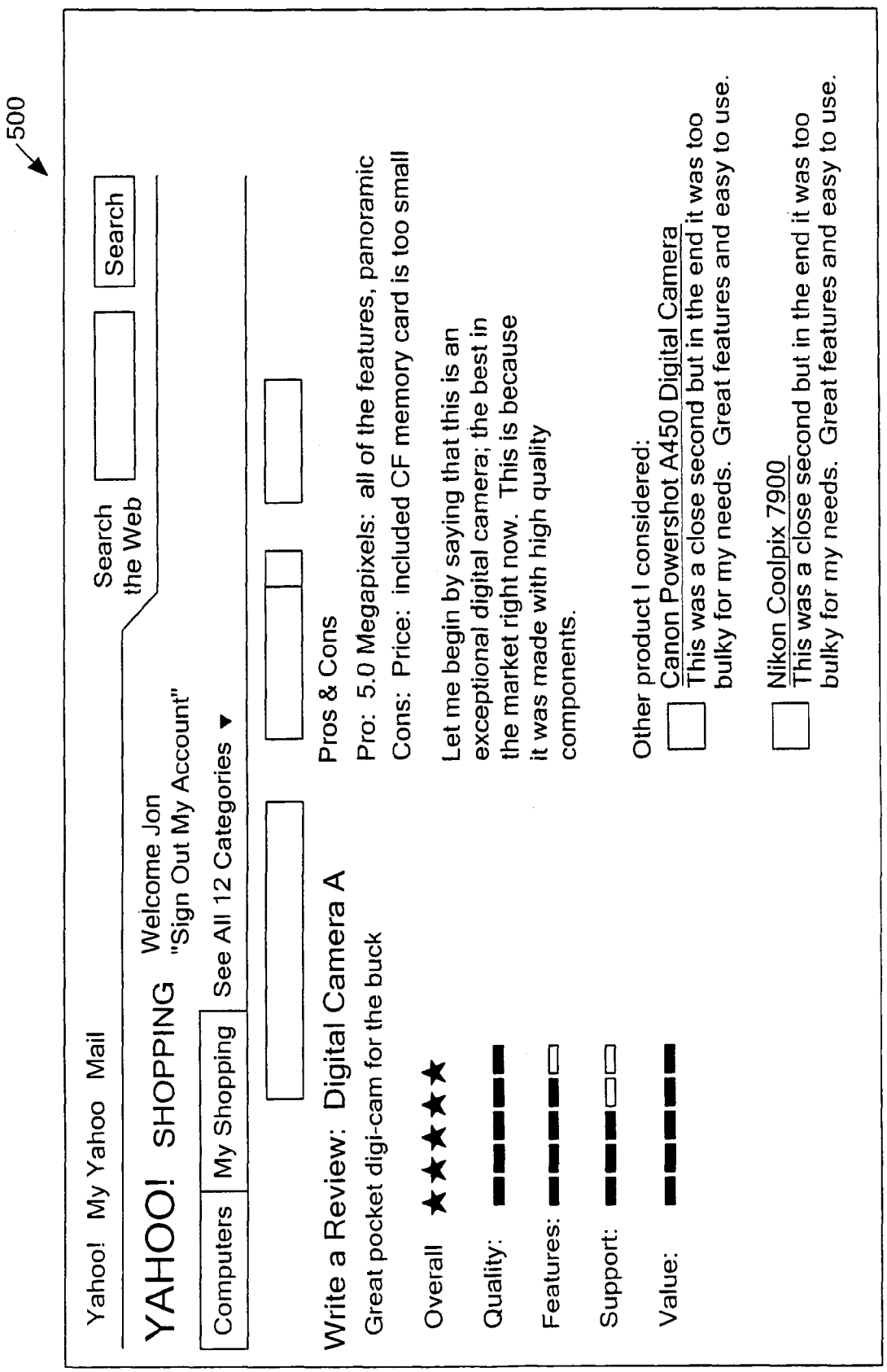
FIG. 5 illustrates an exemplary completed product review, in accordance with an embodiment of the invention.

Once a set of other products has been added to the other-product control 402, in one embodiment, the review writing tool prompts the user to input comments about the selected other product. For example, in FIG. 4, the review writing user interface 400 includes a comments control 415 in which review writer can give a brief description of the other product and provide whatever comments, hyperlinks, and information the review writer believes might be helpful to subsequent review readers who are evaluating the product Save the Product Review After the review had been supplemented with tool-provided information, the review writer saves and publishes the product review using user interface controls, such as publish control 405 and save control 406. The product review when saved is placed by the review writing tool in a web location so that subsequent review readers can find the review. FIG. 5 illustrates an example webpage 500 for a completed product review, which includes elements and features described. Note that the enhanced reviews should increase retention of customers through more valued user reviews and enjoyment of use.

Example Operation of Writing an Enhanced Review

To illustrate the procedure of writing an enhanced product review, consider the example of a user named Harry who recently purchased a digital camera online. Photography is one of Harry's hobbies and, as a result, he is familiar with the makes and models of various digital cameras, their strengths and weaknesses, cost, their features and other such information. Accordingly, Harry would like to write a review to help subsequent online users searching for information on digital cameras to make a good camera choice.

Figure 6:
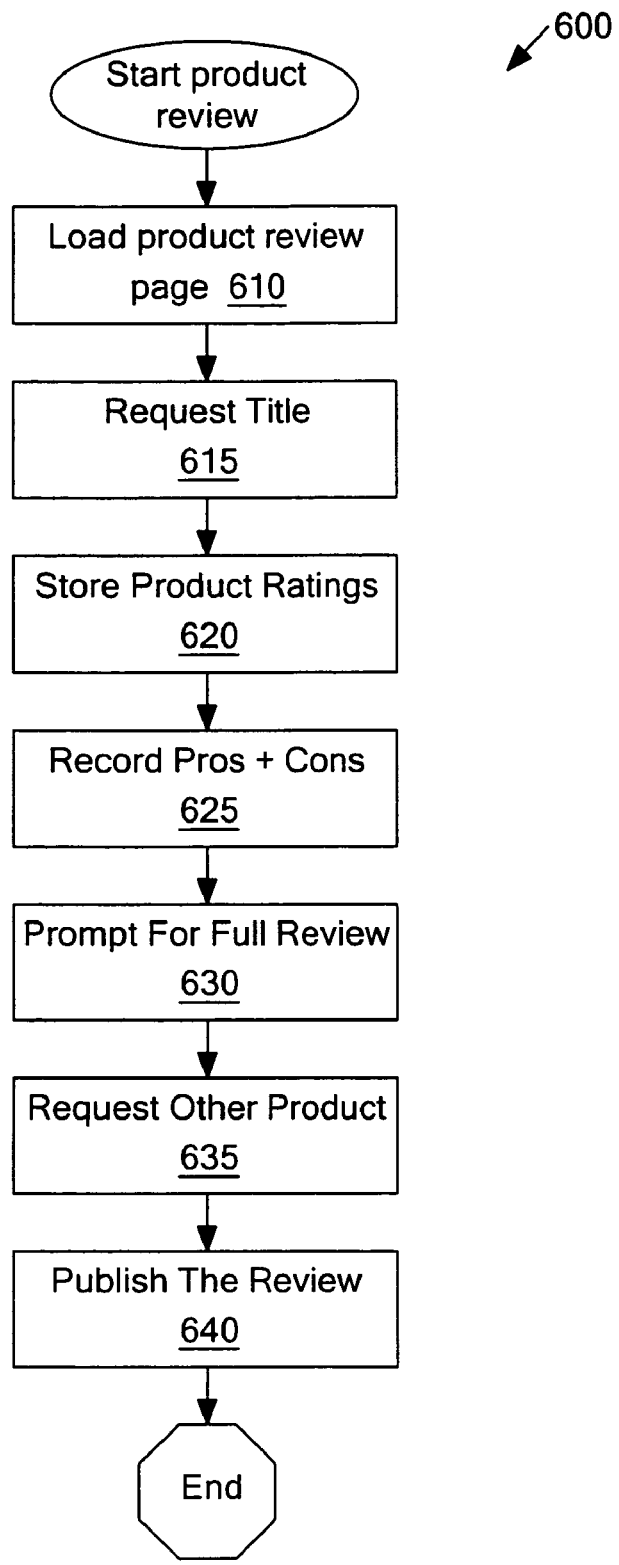
FIG. 6 is a flowchart illustrating a method for creating an enhanced product review, in accordance with an embodiment of the invention.

To do so, Harry decides to write an enhanced product review. FIG. 6 illustrates example procedure 600 for writing the enhanced product review. Note that although a certain number of steps are illustrated in procedure 600, in other embodiments, additional steps may be included to enhance the product reviewing process, the steps may be performed in a different order, some steps may be combined, others may be separated, or some of the steps may be skipped.

At step 610, Harry initiates the process of drafting an enhanced review. For example, after completing his online purchase, Harry receives a prompt in his web browser to write a product review for the digital camera he just purchased. In other scenarios, the prompt to write the product review may be sent by the online retailer to Harry through email, a URL, or through some other electronic communication. According to one embodiment, the prompt may also be sent after Harry has confirmed receipt of the product. Alternatively, Harry could browse to an online product review website and initiate the review on his own.

Since Harry wants to write the review, he acknowledges the prompt (e.g., by clicking a user interface control that states "proceed to product review"). Accordingly, his web browser is redirected to the product review entry website. Generally, the product review entry website is associated with an online retailer; however, the product review entry website may be separate from the online retailer's own website.

The product review entry website Harry's web browser is redirected to is one that requires users to register and sign-in before they can post comments. Accordingly, Harry goes through the registration process (e.g., creates a user name and password, provides his email address, etc.) and signs in.

Once Harry has access to the product review website, in one embodiment, the product review website launches a review writing tool to collect product review information from Harry.

At step 615, the review writing tool displays a user interface to Harry in his web browser that includes various prompts to gather information for the product review. For example, as illustrated in FIG. 1, the review writing user interface 100 may include prompts to create a title for the review and input ratings for the purchased digital camera.

Here, Harry decides to manually enter the make and model number of the digital camera he recently purchased in a title control. Alternatively, the review writing tool imports the make and model number of the digital camera from the previous purchasing webpage. In one embodiment, Harry searches for the digital camera in a list of products retrieved from a product repository. Note that in one embodiment, the title control displays recently viewed or purchased products by Harry from the online retailer.

After Harry has entered the title for the product review, at step 620, Harry receives a prompt from the review writing tool to rate the digital camera according to a variety of measures. For example, FIG. 1 illustrates example user interface controls for collecting a user's ratings for a product. In this case, Harry is prompted to rate the product according to four different metrics, quality, features, support, and value. In other embodiments, he may be prompted to rate the digital camera on a different set of criteria.

Harry really likes the digital camera he purchased and gives the digital camera good ratings ranging from 4 to 5 for each criterion. Those scores are compiled into a single overall rating for the digital camera of 4.5. The technique for calculating the overall rating may vary. In this case, the overall rating for the digital camera is the average of the four scores of the different criteria. Harry's ratings are also combined with other users' ratings of the digital camera to come up with a set of combined scores that correspond to each criterion.

To keep Harry interested, as soon as he has completed inputting his ratings for the digital camera, the review writing tool informs Harry that he is doing a good job and that his input will help later purchasers make a better purchase decision. Harry, feeling giddy that he may actually be able to help somebody, decides to continue writing the review. Accordingly, the review writing tool transitions Harry's web browser to the next stage of the review writing process.

At step 625, Harry is prompted by the review writing tool to add some basic pros and cons to the product review. FIG. 2 illustrates an example user interface 200 for obtaining pro and con information. Accordingly, Harry inputs the pros for the camera. For example, Harry really likes the overall quality of pictures that the camera takes, he thinks the colors are bright when taken in good light, the camera is reasonably priced, and the camera comes with excellent photo editing software. Then, Harry enters the cons. For example, the digital camera may not have the best battery life and may take low quality pictures in low-light areas. After completing this section of the product review, Harry decides he would like to make sure he spelled everything correctly in that portion of the review. Accordingly, in one embodiment, the review writing tool includes a spell-check control that Harry clicks on to initiate the spell-check. Once complete, Harry continues to the next stage of the review drafting process. Although, Harry may be prompted to save or even publish the product review at this point.

At step 630, the review writing tool prompts Harry for a full review, which basically allows Harry to write in detail the reasons for picking the digital camera he purchased and why he did not purchase competing products. The full review also allows Harry to describe accessories that he bought or would like to buy for his digital camera. FIG. 3 illustrates an example user interface 300 implemented by the review writing tool for collecting information for a full review. Accordingly, Harry types up the reasons why he likes the digital camera. For example, he describe the number of features the camera has, the experience he had with a digital camera by the same maker, the cost, and how the camera compared to other digital cameras. He then comments on how much he likes photography and even includes a link to a website that has some of the pictures he has recently taken.

In one embodiment, after Harry has finished drafting the full review he can again run a spell-check on the text he input. In one embodiment, he also decides to run a scanning tool provided by the review writing tool that searches for other products mentioned in the full review by looking for keywords and phrases associated with products and information in the review writing tools associated product repository. If any product matches are found in the product repository, the review writing tool converts the text for those products into links to those other mentioned digital cameras.

At step 635, the review writing tool provides prompts that allow Harry to add a list of other products he evaluated, considered, and is familiar with before purchasing the digital camera he did. FIG. 4 illustrates an example user interface 400 provided by the review writing tool to create the list of other products. For example, before purchasing his digital camera, Harry researched online, spoke with other photography buffs, and went to a retail store and actually tested a variety of different cameras. In the end, he really liked three of the cameras, and ended up purchasing the cheapest one since he did not think he needed some of the extra features offered by the other two cameras.

In his review, however, Harry wants to let people know that the other two digital cameras are very good. So he adds those digital cameras to the product review using the prompts provided by the review writing tool. For example, the review writing tool includes a user interface control that allows Harry to browse for other products stored in a product repository. Accordingly, Harry selects the controls provided in the user interface to browse for the other two cameras. Assuming the product repository has entries for those two cameras, Harry finds the entries for those cameras and drags them into the product review. In one embodiment, Harry also adds comments as to why he liked those cameras.

Finally, at step 640, Harry is prompted to publish the product review by the review writing tool. When Harry selects the publish option, all the information he provided is saved and added to a webpage that is uploaded to the product review's website. FIG. 5 illustrates an example webpage 500 of a product review. Then review readers can access the product review to find out more about the digital camera.

Hardware Overview

Figure 7:
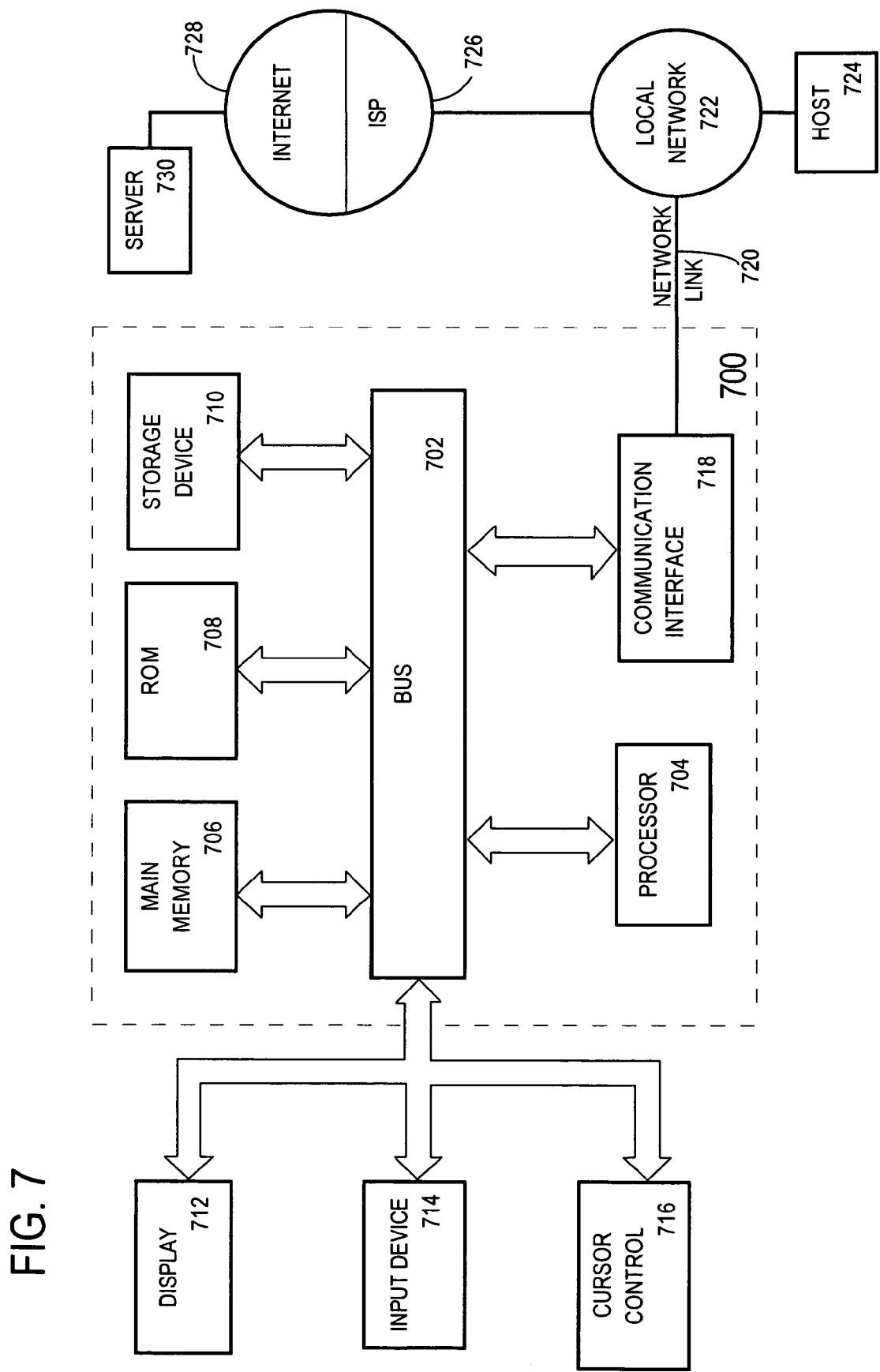
FIG. 7 is a block diagram that illustrates a computing device upon which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one implementation of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A method for enhancing a product review comprising:
presenting to a user an input review page associated with a particular product, wherein the input review page presents to the user one or more first controls for specifying the user's opinion relative to said particular product;
generating and displaying a list of related products;
wherein the step of generating the list of related products includes performing at least one of:
  (a) determining which products to include in the list based, at least in part, on purchasing habits of users, other than said user, that have purchased said particular product; or
  (b) extracting a set of keywords from the user's opinion relative to the particular product;
    submitting the set of keywords to a product repository; and
    generating the list of products based on search results provided by the product repository; and
in conjunction with the displayed list of related products, displaying to the user one or more second controls that allow the user to specify which of those products in the list of related products were considered by said user;
wherein the steps are performed by one or more computing devices.

2. The method of claim 1, further comprising:
recording, through the input review page, which of the products in the list of related products were considered by said user; and
presenting the list of related products so a reader of the product review sees the other products that were considered by said user.

3. The method of claim 1, wherein the one or more controls for specifying the user's opinion relative to said particular product comprises:
a title control for adding a title in the input review page; and
a ratings control for inputting rating information through the input review page for the particular product.

4. The method of claim 1, wherein one or more controls for specifying the user's opinion relative to said particular product further comprises:
one or more comment controls for adding comments about said particular product through the product review page.

5. The method of claim 4, wherein the one or more comment controls include a pros-cons control and a full-review control.

6. The method of claim 1, wherein generating a list of related products includes retrieving the list of related products from a product repository.

7. The method of claim 1, further comprising:
displaying one or more controls for providing the user with instructions on how to specify the user's opinion relative to said particular product.

8. The method of claim 7, wherein displaying one or more controls for providing the user with instructions includes:
determining which of the one or more controls for specifying the user's opinion relative to said particular product is currently selected; and
displaying one or more controls that give specific instructions for the currently selected control.

9. The method of claim 1, wherein the list of related products includes competing products.

10. The method of claim 1, wherein the list of related products includes an accessory to a particular product.

11. The method of claim 1, wherein said particular product comprises at least one of a good, movie, person, song, and school class.

12. The method of claim 1, wherein the input review page is a web page.

13. A method comprising:
generating a first page for entering a review of a particular product;
wherein the first page includes one or more first controls for specifying an opinion relative to said product;
sending the first page to a user to allow the user to specify an opinion relative to said particular product;
based on information provided by the user through the first page, storing a review of said particular product;
generating a list of related products other than said particular product;
wherein the step of generating the list of related products includes performing at least one of:
  (a) determining which products to include in the list based, at least in part, on purchasing habits of users, other than said user, that have purchased said particular product; or
  (b) extracting a set of keywords from the user's opinion relative to the particular product;
    submitting the set of keywords to a product repository; and
    generating the list of products based on search results provided by the product repository;
generating a second page that includes said list of related products;
wherein the second page includes one or more second controls for selecting which products in said list of related products were considered by said user;
sending the second page to said user; and based on information provided by the user through the second page, storing, in association with said review of the particular product, information that indicates which products in said list of related products were selected by said user;

wherein the steps are performed by one or more computing devices.

14. The method of claim 13, further comprising:
presenting the related products so a reader of the review of the particular product sees which related products in said list were selected by said user.

15. The method of claim 13, wherein the one or more controls for specifying the user's opinion relative to said particular product comprises:
a title control for adding a title in the input review page; and
a ratings control for inputting rating information through the input review page for the particular product.

16. The method of claim 13, wherein one or more controls for specifying the user's opinion relative to said particular product further comprises:
one or more comment controls for adding comments about said particular product through the product review page.

17. The method of claim 16, wherein the one or more comment controls include a pros-cons control and a full-review control.

18. The method of claim 13, wherein generating a list of related products other than said particular product includes retrieving the list of related products from a product repository.

19. The method of claim 13, further comprising:
displaying one or more controls to provide the user with instructions on how to specify the user's opinion relative to said particular product.

20. A non-transitory computer-readable storage medium storing one or more sequences of instructions which, when executed by one or more processors, causes the one or more processors to perform the steps of:
presenting to a user an input review page associated with a particular product, wherein the input review page presents to the user one or more first controls for specifying the user's opinion relative to said particular product;
generating and displaying a list of related products;
wherein the step of generating the list of related products includes performing at least one of:
(a) determining which products to include in the list based, at least in part, on purchasing habits of users, other than said user, that have purchased said particular product; or
(b) extracting a set of keywords from the user's opinion relative to the particular product;
submitting the set of keywords to a product repository; and
generating the list of products based on search results provided by the product repository; and
in conjunction with the displayed list of related products, displaying to the user one or more second controls that allow the user to specify which of those products in the list of related products were considered by said user.

21. The non-transitory computer-readable storage medium of claim 20, wherein the list of related products and the one or more second controls are displayed on said input review page along with the one or more first controls for specifying the user's opinion relative to said particular product.

22. The non-transitory computer-readable storage medium of claim 20, wherein said list of related products and one or more second controls are displayed on a second page separate from said input review page.

23. The non-transitory computer-readable storage medium of claim 20, further comprising:
recording, through the input review page, which of the products in the list of related products were considered by said user; and
presenting the list of related products so a reader of the product review sees the other products that were considered by said user.

24. The non-transitory computer-readable storage medium of claim 20, wherein the one or more controls for specifying the user's opinion relative to said particular product comprises:
a title control for adding a title in the input review page; and
a ratings control for inputting rating information through the input review page for the particular product.

25. The non-transitory computer-readable storage medium of claim 20, wherein generating a list of related products includes retrieving a set of other products from a product repository.

* * * * *